US 7,313,694 B2

(12) United States Patent
Riedel et al.

(10) Patent No.: US 7,313,694 B2
(45) Date of Patent: Dec. 25, 2007

(54) SECURE FILE ACCESS CONTROL VIA DIRECTORY ENCRYPTION

(75) Inventors: Erik Riedel, San Francisco, CA (US); Mahesh Kallahalla, Palo Alto, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 09/972,385

(22) Filed: Oct. 5, 2001

(65) Prior Publication Data
US 2003/0070071 A1    Apr. 10, 2003

(51) Int. Cl.
H04L 9/00    (2006.01)
(52) U.S. Cl. .......................... 713/165; 726/27
(58) Field of Classification Search ................ 713/165, 713/201, 182; 726/27; 380/282, 285
See application file for complete search history.

(56) References Cited

U.S. PATENT DOCUMENTS

| | | | | |
|---|---|---|---|---|
| 6,301,660 | B1 * | 10/2001 | Benson ........................ | 713/165 |
| 6,523,116 | B1 * | 2/2003 | Berman ........................ | 713/182 |
| 6,847,995 | B1 * | 1/2005 | Hubbard et al. ............ | 709/223 |
| 2002/0062451 | A1 * | 5/2002 | Scheidt et al. .............. | 713/201 |
| 2002/0194484 | A1 * | 12/2002 | Bolosky et al. ............. | 713/189 |

FOREIGN PATENT DOCUMENTS

EP    0636962 A2 *  1/1995

OTHER PUBLICATIONS

H. Gobioff, G. Gibson, and D. Tygar. Security for network attached storage devices. "Technical report," CMU-CS-97-185, Oct. 23, 1997.

D. Mazieres, M. Kaminsky, M. Kaashoek, and E. Witchel. Separating key management from file system secruity. "SOSP", Dec. 1999.

M. Satyanarayana. Scalable, secure, and highly available distributed file access. "ACM Computer," May 1990.

P. Reiher, J. Cook, S. Crocker. Truffles—A secure service for widespread file sharing. "PSRG Workshop on Network and Distributed System Security," 1993.

K. Fu, M. Kaashoek and D. Mazieres. Fast and secure distributed read-only file system. "OSDI," Oct. 2000.

M. Blaze. A cryptographic file system for UNIX. "Proceedings of 1st ACM Conference on Communications and Computing Security," 1993.

(Continued)

*Primary Examiner*—Emmanuel L. Moise
*Assistant Examiner*—Ali S Abyaneh

(57) ABSTRACT

A technique for secure file access control via directory encryption. Filenames of data files stored by a network server are encrypted so as to protect them in the event the server is untrustworthy, such as in a distributed computing environment. Two encryption keys are employed so as to provide different access capabilities. For example, clients of the server that are authorized to perform read-only operations on the files may be prevented from modifying the files, while client that are authorized to perform write operations, may modify the files or even delete the files. In a preferred embodiment, encrypted filenames replace plaintext files in a directory structure without otherwise changing the directory structure. Because the directory structure is otherwise unchanged, the server may still have adequate information to perform file management and space management functions.

34 Claims, 5 Drawing Sheets

OTHER PUBLICATIONS

E. Zadok, I. Badulescu and A. Shender. Cryptfs: A stackable vnode level encryption file system. "Technical Report CUCS-021-98," 1998.

G. Cattaneo, G. Persiano, A. Del Sorbo, A. Cozzolino, E. Mauriello and R. Pisapia. Design and implementation of a transparent cryptographic file system for UNIX. "Technical Report, University of Salerno," 1997.

* cited by examiner

SECURE FILE ACCESS CONTROL VIA DIRECTORY ENCRYPTION

FIELD OF THE INVENTION

The present invention relates to the field of data storage for computer systems. More particularly, the present invention relates to the field of data security for computer storage systems.

BACKGROUND OF THE INVENTION

In a distributed computer system, data storage is typically performed by a centralized storage server or by multiple storage nodes. Networked clients may store files and retrieve files from this system and use the storage system as a shared data repository. For example, files may be shared by a client retrieving and reading a file previously stored by another client. As another example, several different clients may contribute to a single file, such as by modifying the file.

Computer system users and organizations are becoming increasingly dependent upon shared, networked data. As this dependence increases, the need to protect this data from prying or malicious persons becomes increasingly critical. There are currently a number of data security schemes for networked computing environments. However, two principal conventional approaches each have their drawbacks.

One conventional data security approach is to encrypt the data on the server. In such a system, the clients typically perform the encryption prior to uploading their files to the server. And, since filenames are often chosen by users for their ability to accurately describe the contents stored in the associated data file, the entire directory structure, including filenames and files are typically encrypted in such a scheme. A drawback is that the server has limited ability to perform file management and space management functions since it has limited access to the files and to the directory. Alternately, the server maintains control of the underlying file system. This allows improved file management functionality of the server. In such a system, however, the server needs to be trusted or, else, an attack on the server might allow unauthorized persons to access file information.

Another conventional approach is to provide security protection for communications between the storage server and clients. Accordingly, the data is often stored as plaintext (not encrypted), but is then encrypted for transmission and decrypted upon reception. This protects the data against eavesdroppers on insecure communication channels. However, this does not protect against an untrustworthy server, such where servers are shared among several administrative domains, nor does this scheme protect against attacks directly on the server. Another disadvantage of this scheme is that the server needs to perform encryption and decryption as requests are made. This requires that the server have sufficient processing power and also tends to increase latency for accesses to the server.

Therefore, what is needed is an improved technique for securing data in a storage system that does not suffer from the aforementioned drawbacks. In addition, such a technique should allow different access capabilities for clients who share a file, such as to prevent those clients who are authorized only to read file from making changes to the file. It is to these ends that the present invention is directed.

SUMMARY OF THE INVENTION

The invention is a technique for secure file access control via directory encryption. Filenames of data files stored by a network server are encrypted so as to protect them in the event the server is untrustworthy, such as in a distributed computing environment. Two encryption keys are employed so as to provide different access capabilities. For example, clients of the server that are authorized to perform read-only operations on the files may be prevented from modifying the files, while clients that are authorized to perform write operations, may modify the files or even delete the files. In a preferred embodiment, encrypted filenames replace plaintext files in a directory structure without otherwise changing the directory structure. Because the directory structure is otherwise unchanged, the server may still have adequate information to perform file management and space management functions.

In accordance with an aspect of the invention, a method of, and apparatus for, file access control is provided. An encrypted filename of a file is stored at a location in a computing system (e.g., at a server). The encrypted filename is converted into a plaintext filename (e.g., at a client). The plaintext filename is modified into a modified filename. An entity (e.g., the client) is authorized to access the file for performing a type of operation (e.g., a write operation) on the file based on the modified filename.

To convert the encrypted filename into the plaintext filename, as indicated above, a combination of two encryption keys may be used. To encrypt the plaintext filename into the modified filename, as indicated above, a first one of the two encryption keys may be used. To encrypt the modified filename to determine whether the result matches the encrypted filename, as indicated above, the second one of the two encryption keys may be used.

A first one of the two encryption keys may be used to encrypt the plaintext filename and a hash function may be performed on the filename, thereby forming the modified filename. The modified filename may be compared to a stored hash value.

The encrypted filename may be encrypted using a first key prior to being stored and a second encrypted filename of the file (encrypted using a second key) may be stored at the location. The first key may be used to convert the encrypted filename into the plaintext filename. The second key may be used to encrypt the plaintext filename into the modified filename. The modified filename may be compared to the second encrypted filename. A hash function may be performed on the filename after using the second key to encrypt the plaintext filename.

The plaintext filename may permit read access to the file. The encrypted filename may be substituted into a directory structure in place of the plaintext filename.

In accordance with another aspect of the invention, an apparatus for controlling access to a file includes a server having a stored encrypted filename of a file. The server is in communication with a writer and a reader. The writer is a client of the server and has a first key that permits the writer to write to the file. The reader is another client of the server and has a combination of the first key and a second key which permits the reader to read the file.

The stored encrypted filename may be obtained by encrypting a filename of the file using the combination of the first key and the second key. The server may determine that the writer is authorized to write to the file by receiving from the writer the filename encrypted using the first key, and encrypting the received filename again using the second key thereby forming a twice encrypted filename and, then, comparing the twice encrypted filename to the stored encrypted filename. Alternately, the server may determine that the writer is authorized to write to the file by receiving from the writer the filename encrypted using the first key, and applying a hash function to the received filename thereby forming a computed hash value and comparing the computed hash value to a stored hash value.

In accordance with yet another aspect of the invention, an apparatus for controlling access to a file includes a server having a first stored encrypted filename of the file and a second stored encrypted filename of the file. The server is in communication with a writer and a reader. The writer is a client of the server and has a first key that permits the writer to write to the file. The reader is another client of the server and has a second key that permits the reader to read the file.

The reader may decrypt the first stored encrypted filename using the first key. The server may determine that the writer is authorized to write to the file by receiving from the writer the filename encrypted using the second key and comparing the received filename to the second stored encrypted filename. The server may perform a hash function on the received filename before comparing the received filename to the second stored encrypted filename.

DETAILED DESCRIPTION OF A PREFERRED EMBODIMENT

Figure 1:
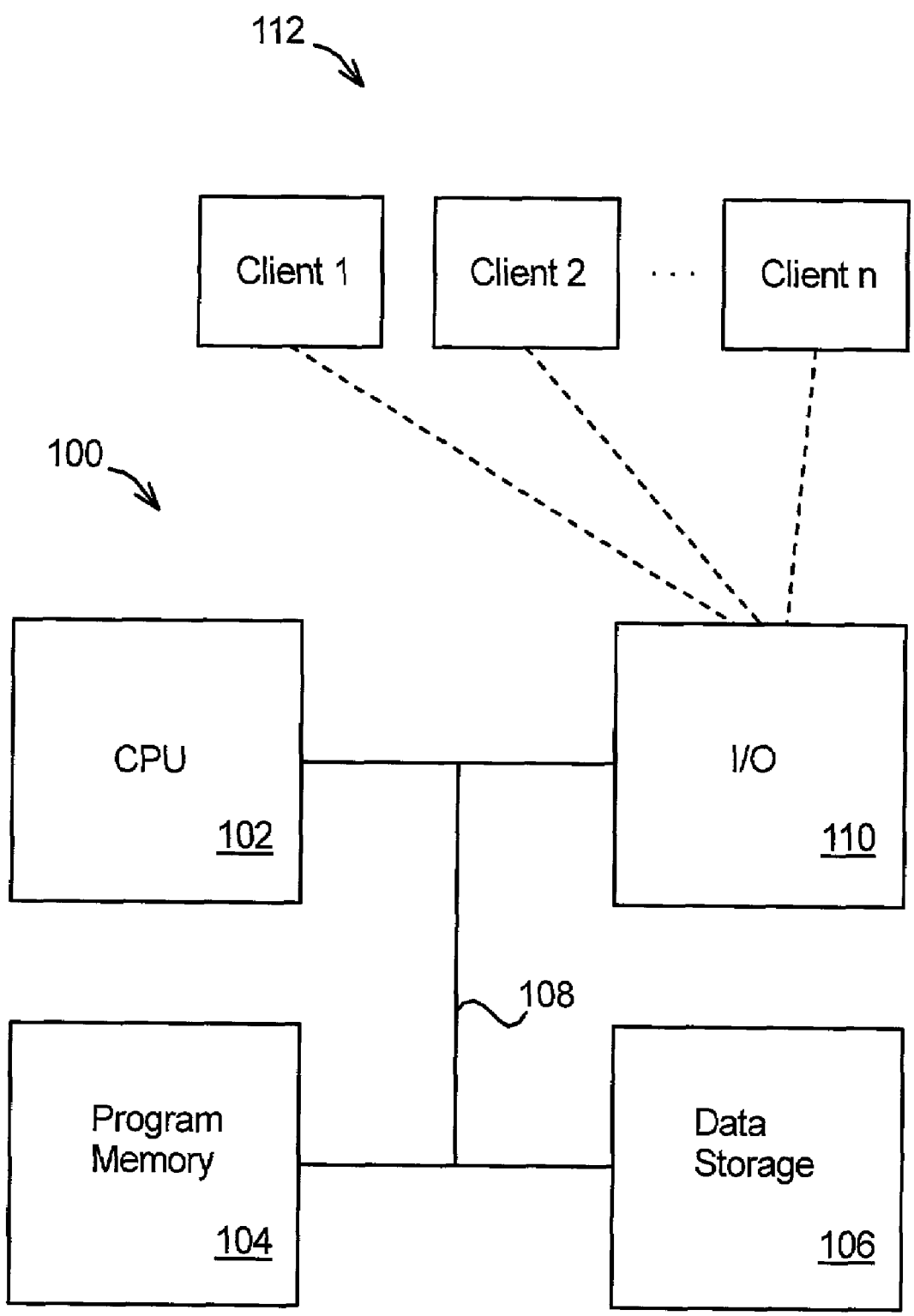
FIG. 1 illustrates a block schematic diagram of a general-purpose computer system by which the present invention may be implemented.

FIG. 1 illustrates a block schematic diagram of a computer system 100 by which the present invention may be implemented. The computer system 100 may include a general-purpose processor 102, program memory 104 (e.g., RAM), data storage 106 (e.g., one or more hard disks), a communication bus 108, and input/output devices 110, such as a keyboard, monitor, mouse and network interface. The computer system 100 is conventional. As such, it will be apparent that the system 100 may include more or fewer elements than shown in FIG. 1 and that other elements may be substituted for those illustrated in FIG. 1. One or more software programs for implementing the present invention may be stored in the memory 104.

In one embodiment, the computer system 100 functions as a network file server or database system. Accordingly, the system 100 may provide access to a significant quantity of data stored in the memory 106. A number of networked clients (e.g., workstations) 112 may, for example, access the data via the system 100. Note that the server 100 may be implemented by a single network node (a centralized server) or implemented by multiple network nodes (a distributed server).

Figure 2:
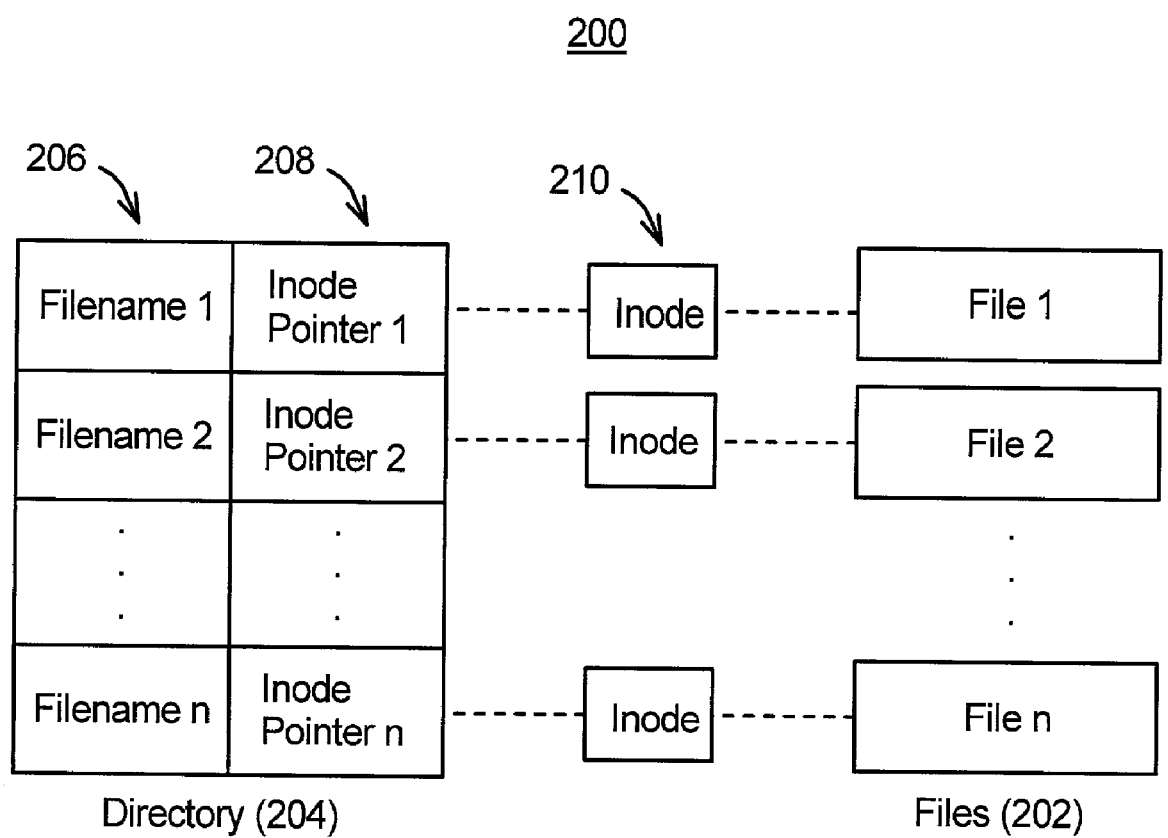
FIG. 2 illustrates diagrammatically a file structure for data stored in the data storage system of FIG. 1.

FIG. 2 illustrates diagrammatically a file structure 200 for data that may be stored in the data storage system 106 of FIG. 1. As shown in FIG. 2, the file structure 200 includes files 202 and a directory 204. The directory 204 may include filenames 206 and pointers 208 (also referred to "inode pointers," as in UNIX operating systems). The directory 204 may be further linked to the files 202 by file information 210 (also referred to as "inodes," as in UNIX operating systems). Thus, for each of a number n of the files 202, a corresponding entry in the directory 204 may include a file name 206 and a pointer 208.

The inode pointers 208 point to inodes 210 in the structure 200 which contain information about each of the corresponding files 202. For each file, this inode 210 may include, for example, time stamps indicating when the file was created and/or last modified, ownership information, size and location. Thus, to access a file, such as to read the file or write to the file, a client 112 (FIG. 1) of the server 100 may provide a request to the server 100. The request indicates the operation (e.g., read or write) and the particular filename 206. The server 100 then uses the filename 206 to identify the inode pointer 208 for the file. The inode pointer 208 and inode 210 are then used to locate the file itself. The server 100 then performs the instruction on the file. In a preferred embodiment, the directory structure 200 is in accordance with the UNIX operating system, however, it will be apparent that another directory structure may be selected.

Figure 3:
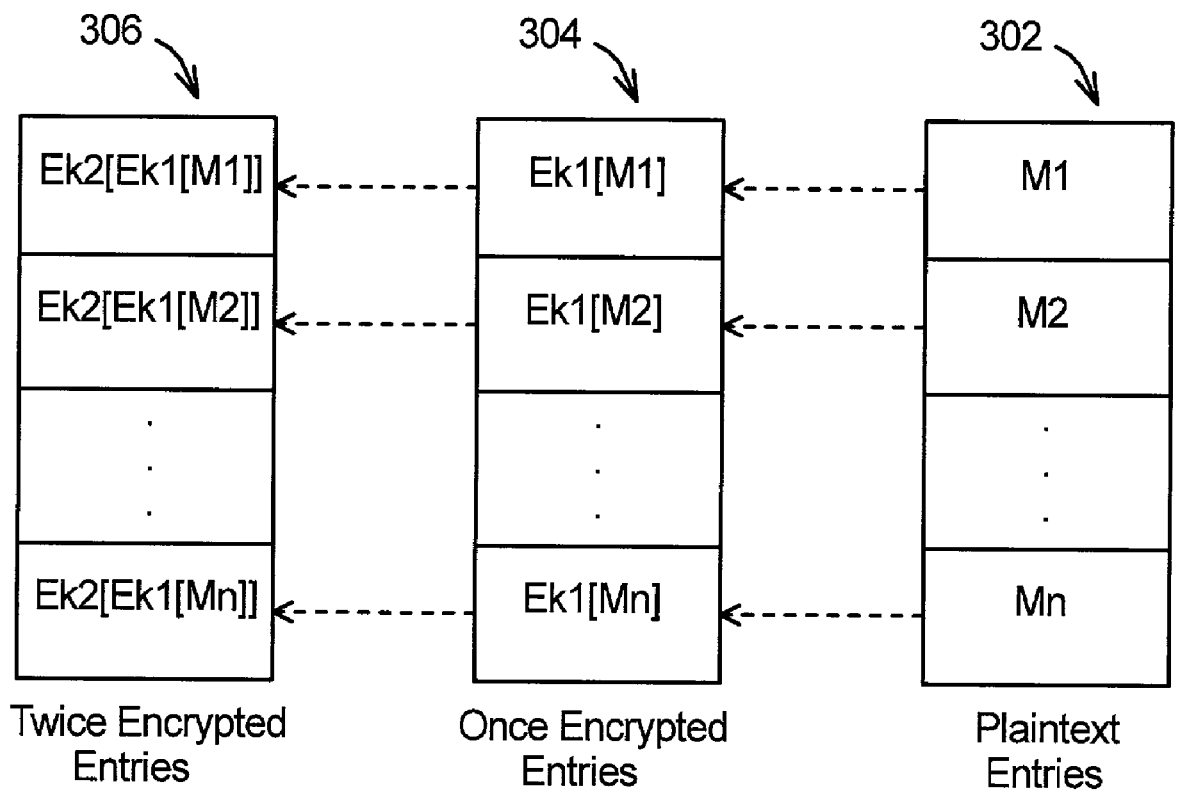
FIG. 3 illustrates diagrammatically file directory entries encrypted in accordance with the present invention.

In accordance with the present invention, entries in the directory 204 are encrypted in order to prevent unauthorized access to the files 202. FIG. 3 illustrates diagrammatically file directory entries encrypted in accordance with one embodiment of the present invention. Unencrypted (also referred to as "plaintext") directory entries 302, which might be stored in the directory 204 of FIG. 2, are instead replaced with encrypted directory entries 306.

To form the directory entries 306, each of the plaintext entries 302 is encrypted using two different encryption keys k1 and k2. More particularly, a plaintext entry is encrypted using the key k1. The encrypted portion of the entry 302 preferably includes only the corresponding filename 206 (FIG. 2) and not the inode pointer 208 (FIG. 2). However, with appropriate modifications, the inode pointer 208 may be encrypted. For simplicity, these various possibilities are all referred herein to as encryption of the filename.

An encryption operation "E" using key k1 on a directory entry "M" may be given as: Ek1[M]. This operation may be used to form the directory entries 304 shown in FIG. 3. Next, the entries 304 may be encrypted using the key k2 to form the entries 306. Thus, the encryption operation E using key k2 on a once encrypted entry Ek1[M] may be given as: Ek2[Ek1[M]].

The encryption operation E has the property that:

$$Ek2[Ek1[M]] = E(k1*k2)[M]$$

That is, the entries 306 can be obtained by first encrypting a plaintext entry 302 using the key k1 and then encrypting the result using the key k2 or, equivalently, by combining the two keys k1 and k2 (given as:k1*k2) and then encrypting the plaintext entry using the combined key (k1*k2). The operation by which the key are combined (given by: *) may be any operation, such as multiplication, that satisfies the above property. To provide effective security, it should be computationally difficult to derive one of the keys from the other key and the combined key (k1*k2).

Note that the once encrypted entries 304 need not actually be computed or stored. For example, the twice encrypted entries 306 can be computed directly from the entries 302 using the product of the two keys.

The doubly encrypted entries 306 may be stored in the directory 202 (FIG. 2) of the server 100 (FIG. 1). In addition, the server 100 may be provided with one of the keys (e.g., the key k2). As an example, a client who creates a file (the "owner" of the file) may generate or select the keys k1 and k2 to be used for encrypting the associated directory entries. The selected keys may be used for a single data file or for plural data files, depending upon the circumstances. For example, where a collection of files are related, such as files created by a particular group within an organization, the same keys may be assigned to the collection of files. The key k2 may then be communicated from the client 112 to the server 100, which then stores key k2.

Clients 112 (or persons) who are authorized to perform write operations ("writers") on the files 202 may be given the key not provided to the server 100 (e.g., the key k1) and the plaintext filename 302 of the file to be written to. The client system 112 may encrypt the plaintext filename using the key k1 and then may provide the result (Ek1[M]) to the server 100. The server 100 may encrypt the result (Ek1[M]) received from the client 112 using the key k2 and then may attempt to match the result to the twice encrypted entries 306 stored in the directory 204 (FIG. 2). If a match is found, the server 100 may then allow the client 112 to perform desired write operations to the file. Otherwise, the write operation may be disallowed. Accordingly, the plaintext filename encrypted using the key k2 provides write authorization.

Clients 112 (or persons) who are authorized to perform read operations ("readers") on the files 202 (FIG. 2) may be given the combination of the two keys (k1*k2). The client system 112 may then decrypt the twice encrypted filenames 306 to recover the plaintext filenames 302 using the combination of the keys (k1*k2). From the plaintext filenames 302, the user may then determine which of the files 202 the user desires to read. Then, the client system 112 may encrypt the plaintext filename 302 of the desired file to be read using the two keys k1 and k2. The client system 112 may then provide the result (Ek2[Ek2[M]]) to the server 100. The server 200 may then compare the result (Ek2[Ek2[M]]) to the twice encrypted entries 306 stored in the directory 204 (FIG. 2). If a match is found, the client may then perform desired read operations to the file. Accordingly, the plaintext filename encrypted using the combination of keys (k1*k2) provides read authorization. Readers will not generally be able to factor the product (k1*k2) into the constituent keys. Accordingly, readers will not be able to gain access to the key k2 from the product (k1*k2) and, thus, will not be able to perform write operations on the files 202.

Note that clients 112 who are authorized to perform read operations on a file or group of files 202 will generally include those clients 112 who are authorized to perform write operations on the file or files. Accordingly, clients 112 who are authorized to perform write operations may be given the key k1 or the combination of the two keys (k1 and k2), in addition to the key k2. This will allow writers to obtain the plaintext filenames 302 from the twice encrypted filenames 306 so that the writers will be able to identify a file desired to be written to by its plaintext filename.

One disadvantage of the embodiment described above may be that the server 100 has access to the key k2. Thus, if the server 100 is not trusted (e.g., not physically secure), the key k2 might be obtained by unauthorized persons. Accordingly, in accordance with a first alternate embodiment of the invention, the server 100 does not have access to the key k2. Rather, the server 100 stores hash values for the twice encrypted values.

Figure 4:
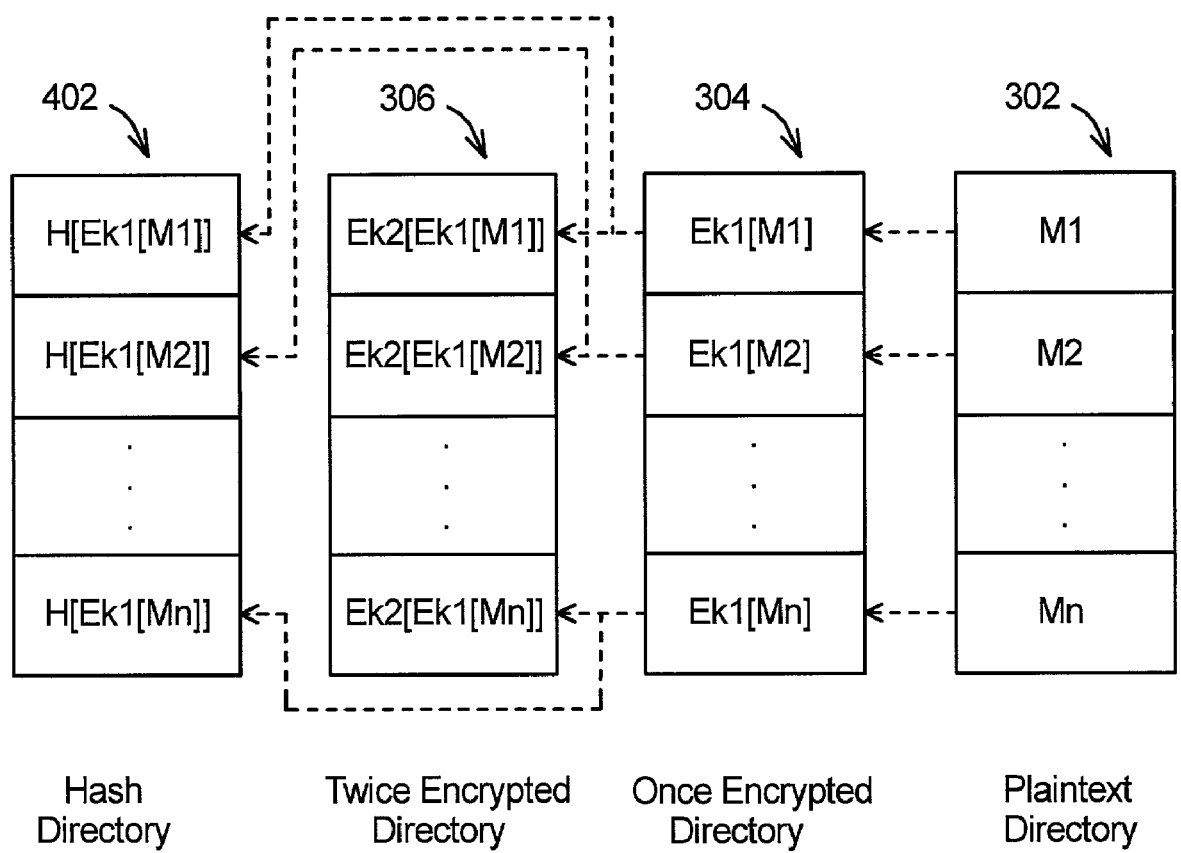
FIG. 4 illustrates diagrammatically file directory entries encrypted in accordance with a first alternate embodiment of the present invention.

More particularly, FIG. 4 illustrates diagrammatically file directory entries encrypted in accordance with a first alternate embodiment of the present invention. Similarly to FIG. 3, FIG. 4 illustrates the plaintext filenames 302, the once encrypted filenames 304 (given by: Ek1[M]), the twice encrypted filenames 306 (given by: Ek2[Ek1[M]]or by: E(k1*k2)[M]). In addition, the once encrypted filenames 304 are hashed in accordance with a hash function H to form hashed values 402 given by: H[Ek1[M]]. In a preferred embodiment, the hash function H is one-way; that is, the hashed values 402 can be readily determined from the encrypted filenames 304, however, the encrypted filenames 304 cannot be readily determined from the hashed values 402. For example, the hash function H may include Secure Hash Algorithm (SHA-1) in accordance with the Secure Hash Standard (SHS). In addition, unlike the keys k1 and k2, the hash function H itself need not be secret.

Similarly to the embodiment of FIG. 3, the server 100 (FIG. 1) stores the twice encrypted filenames 306 and does not store the once encrypted filenames 304 or the plaintext filenames 302. However, instead of storing the key k2, as in the embodiment of FIG. 3, the server 100 (FIG. 1) preferably stores the hashed values 402 in the embodiment of FIG. 4. Accordingly, the embodiment of FIG. 4 overcomes the disadvantage associated with the embodiment of FIG. 3, described above, in which the server 100 has access to the key k2.

Similarly to the embodiment of FIG. 3, clients 112 who are authorized to perform read operations (readers) may be given the combination of the two keys (k1*k2). The combination of the two keys (k1*k2) may be used to decrypt the twice encrypted filenames 306 that are stored in the server 100 into the plaintext filenames 302 so that the files 202 (FIG. 2) may be accessed for reading.

Also, similarly to the embodiment of FIG. 3, clients 112 who are authorized to perform write operations (writers) may be given the key k1. Write operations, however, may be performed differently than in the embodiment of FIG. 3. More particularly, to perform a write operation on a file, the writer may form the once encrypted filename 304 from the plaintext filename 202 using the key k1.

The writer may then provide the once encrypted filename 304 to the server 100. The server 100 may then perform the hash function H on the once encrypted filename 304 to form the hash value 402. Alternately, rather than the server 100 performing the hash function H, the writer may perform the hash function H on the once encrypted filename 304 to form the hash value 402. The writer may then provide the hash value 402 to the server 100.

The server 100 may then attempt to match the hash value 402 to its stored list of hash values 402 to determine if there is a match. Assuming there is a match, the client 112 may then be allowed to perform a desired write operation. Otherwise, if there is no match, the server 100 does not permit the client 112 to perform the write operation.

Accordingly, in the embodiment of FIG. 4, the hash values 402 serve to authenticate authorized writers. Similarly to the embodiment of FIG. 3, authorized readers are permitted to perform read operations, but not write operations. However, unlike the embodiment of FIG. 3, in which the server 100 has access to one of the keys, in the embodiment of FIG. 4, the server 100 does not require access to either of the keys k1 or k2.

As mentioned, the encryption algorithm of the embodiments of FIGS. 3 and 4 is limited in that it is required to have the property that:

$$Ek2[Ek1[M]]=E(k1*k2)[M]$$

Figure 5:
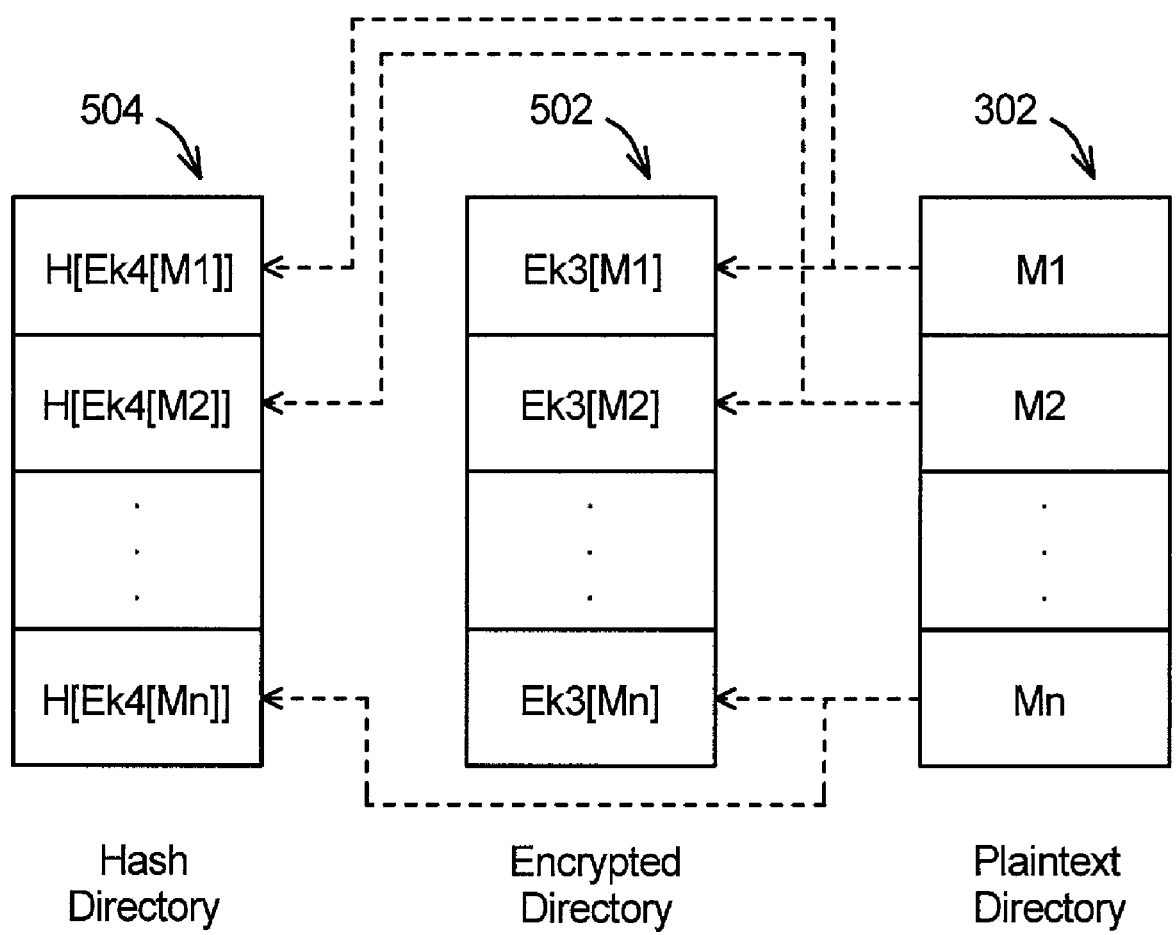
FIG. 5 illustrates diagrammatically file directory entries encrypted in accordance with a second alternate embodiment of the present invention.

FIG. 5 illustrates an embodiment in which the encryption algorithm need not have this property. As shown in FIG. 5, file directory entries are encrypted in accordance with a second alternate embodiment of the present invention. More particularly, FIG. 5 illustrates plaintext filenames 302 (also shown in FIGS. 3 and 4), along with encrypted filenames 502 and hashed (and encrypted) values 504.

To form the encrypted directory entries 502, each of the plaintext entries 302 may be encrypted using an encryption key k3. The encrypted entries 502 may then be stored in the directory 204 (FIG. 2) of the server 100 (FIG. 1). To form the hash values 504, each of the plaintext entries 302 may be encrypted using another encryption key k4 and then hashed using a hash operation H. For example, the hash function H may include Secure Hash Algorithm (SHA-1) in accordance with the Secure Hash Standard (SHS). In addition, unlike the keys k3 and k4, the hash function H itself need not be secret. The hash values 504 may then be stored in the directory 204 of the server 100. Optionally, the hash function may be omitted; in which case, the values 504 may be the plaintext entries encrypted using the key k4.

Note that the portion of the entries 302 used to form the encrypted filenames 502 and the hash values 504 preferably includes only the corresponding filename 206 (FIG. 2) and not the inode pointer 208 (FIG. 2). However, the inode pointer 208 could be encrypted. For simplicity, these different possibilities are all referred to herein as encryption of the filename.

Clients 112 (or persons) who are authorized to perform read operations ("readers") on the files 202 (FIG. 2) may be given the key k3. The client system 112 may then decrypt the encrypted filenames 502 to recover the plaintext filenames 302 using the key k3. From the plaintext filenames 302, the user may then determine which of the files 202 the user desires to read. Then, the client system 112 may encrypt the plaintext filename 302 of the desired file to be read using the key k3. The client system 112 may then provide the result (Ek3[M]) to the server 100. The server 200 may then compare the result (Ek3[M]) to the encrypted entries 502 stored in the directory 204 (FIG. 2). If a match is found, the client may then perform desired read operations to the file. Accordingly, the plaintext filename encrypted using the key k3 provides read authorization.

Clients 112 (or persons) who are authorized to perform write operations ("writers") on the files 202 may be given the key k3 in order to decrypt the filenames 502 into plaintext 302 and perform read operations, as described above for readers. In addition, writers may be given the key k4. Using the key k4, the client system 112 may then encrypt the name of a desired file to form an encrypted filename of the form Ek4[M].

Then, the client 112 provides the encrypted filename Ek4[M] to the server 100, which then performs the hash algorithm to form a hashed and encrypted filename of the form H[Ek4[M]]. Alternately, the client 112 may perform the hash algorithm to form the hashed and encrypted filename H[Ek4[M]]. The client 112 may then provide the filename to the server 100.

The server 100 then compares the filename to the hash values 504. If a match is found, the server 100 may then allow the client 112 to perform desired write operations to the file. Otherwise, the write operation may be disallowed. Accordingly, the plaintext filename encrypted using the key k3 and hashed using the hash function H provides write authorization.

This embodiment illustrated in FIG. 5 has advantages over those of FIGS. 3 and 4 in that a wider range of encryption algorithms are available since there is no requirement that a combination of keys be able to decrypt entries which are encrypted by one key and then the other. Further, the readers are given only one key (e.g., key k3). Accordingly, there is little chance a reader who is not an authorized writer would be able to perform a write operation since that would require the reader to obtain the other key (e.g., the key k4), and there is no relationship between the keys (e.g., one is not a factor or the product of the other as in the embodiments of FIGS. 3 and 4). Similarly to the embodiment of FIG. 4, however, the embodiment of FIG. 5 does not require that the server 100 have access to either key. Accordingly, this scheme provides security even where the server 100 is not trusted.

Any of the embodiments may be used to enhance data security for a system, such as the network file server 100. Additional data security measures may also be employed in such a system. For example, the files 202 themselves may be encrypted when stored in the storage system 108 and communications between the server 100 and clients 112, such as communicated file data, may be encrypted.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of file access control comprising:
   storing an encrypted filename of a file at a location in a computing system; converting the encrypted filename into a plaintext filename; modifying the plaintext filename into a modified filename; and authorizing an entity to access the file for performing a write operation on the file by comparing the modified filename to the stored encrypted filename; wherein said converting comprises using a key that comprises a combination of two encryption keys to convert the encrypted filename into the plaintext filename.

2. The method according to claim 1, wherein said modifying comprises using a first one of the two encryption keys to encrypt the plaintext filename into the modified filename.

3. The method according to claim 2, wherein said authorizing comprises using the second one of the two encryption keys to encrypt the modified filename to form a result and determining whether the result matches the encrypted filename.

4. The method according to claim 1, wherein said modifying comprises using a first one of the two encryption keys to encrypt the plaintext filename and performing a hash function on the filename thereby forming the modified filename.

5. The method according to claim 4, wherein said authorizing comprises comparing the modified filename to a stored hash value.

6. The method according to claim 1, wherein said encrypted filename is encrypted using a first key prior to said storing and further comprising storing a second encrypted filename of the file at the location wherein the second encrypted filename is encrypted using a second key prior to said storing.

7. The method according to claim 6, wherein said converting comprises using the first key to convert the encrypted filename into the plaintext filename.

8. The method according to claim 7, wherein said modifying comprises using the second key to encrypt the plaintext filename into the modified filename.

9. The method according to claim 8, wherein said authorizing comprises comparing the modified filename to the second encrypted filename.

10. The method according to claim 9, wherein said modifying further comprises performing a hash function on the filename after using the second key to encrypt the plaintext filename.

11. The method according to claim 1, wherein the plaintext filename permits read access to the file.

12. The method according to claim 1, wherein said storing comprises substituting said encrypted filename into a directory structure at the location in place of the plaintext filename.

13. The method according to claim 1, further comprising encrypting data of the file.

14. The method according to claim 1, further comprising:
encrypting the plaintext filename using a key that comprises a combination two encryption keys; and comparing a result of this encrypting to the stored encrypted filename to determine whether to permit read access to the file.

15. The method according to claim 14, wherein said modifying comprises using a first one of the two encryption keys to encrypt the plaintext filename into the modified filename.

16. An apparatus for controlling access to a file, comprising:
a server for storing an encrypted filename associated with a file; and a client in communication with the server for retrieving the encrypted filename from the server, for converting the encrypted filename into a plaintext filename and for modifying the plaintext filename into a modified filename, wherein the client provides the modified filename to the server and wherein the server determines whether the client is authorized to perform a write operation on the file by comparing the modified filename received from the client to the stored encrypted filename; wherein said client converts the encrypted filename into the plaintext filename using a key that comprises a combination of two encryption keys.

17. The apparatus according to claim 16, wherein the plaintext filename permits read access to the file.

18. The apparatus according to claim 16, wherein said client forms the modified filename using a first one of the two encryption keys to encrypt the plaintext filename.

19. The apparatus according to claim 18, wherein said server determines whether the client is authorized to perform the write operation on the file by using the second one of the two encryption keys to encrypt the modified filename to form a result and determines whether the result matches the encrypted filename provided by the client.

20. The apparatus according to claim 16, wherein said client forms the modified filename using a first one of the two encryption keys to encrypt the plaintext filename and performs a hash function on the filename thereby forming the modified filename.

21. The apparatus according to claim 16, wherein said server performs a hash function on the filename to form a result and determines whether the client is authorized to perform the read operation on the file by comparing the result to a stored hash value.

22. The apparatus according to claim 16, wherein said client forms the modified filename using a first one of the two encryption keys to encrypt the plaintext filename and performs a hash function on the filename to form a result and wherein the server determines whether the client is authorized to perform the type of operation on the file by comparing the result to a stored hash value.

23. The apparatus according to claim 16, wherein the encrypted filename is encrypted using a first key and wherein the server stores a second encrypted filename wherein the second encrypted filename is encrypted using a second key.

24. The apparatus according to claim 23, wherein the client converts the encrypted filename into the plaintext filename using the first key and modifies the plaintext filename into the modified filename using the second key.

25. The apparatus according to claim 24, wherein the server determines whether the client is authorized to perform the write operation on the file by comparing the modified filename to the second encrypted filename.

26. The apparatus according to claim 25, wherein the server performs a hash function on the filename after the client uses the second key to modify the filename.

27. The apparatus according to claim 25, wherein the client performs a hash function on the filename after using the second key to modify the filename.

28. The apparatus according to claim 16, wherein the client encrypts the plaintext filename and the server compares the encrypted plaintext filename to its stored encrypted filename to determine whether to permit read access to the file.

29. The apparatus according to claim 28, wherein the client encrypts the plaintext filename to form the encrypted plaintext filename using a key that comprises a combination of two encryption keys and the client encrypts the plaintext filename to form the modified filename using a first one of the two encryption keys.

30. An apparatus for controlling access to a file comprising server having a stored encrypted filename of a file, the server being in communication with a writer and a reader, the writer being a client of the server and having a first key that permits the writer to write to the file and the reader being another client of the server and having a combination key that comprises a combination of the first key and a second key wherein the stored encrypted filename is obtained by encrypting a filename of the file using the combination key and the combination key permits the reader to read the file and further wherein the server determines that the writer is authorized to write to the file by receiving from the writer the filename encrypted using the first key, encrypting the received filename again using the second key thereby forming a twice encrypted filename and comparing the twice encrypted filename to the stored encrypted filename.

31. An apparatus for controlling access to a file comprising a server having a stored encrypted filename of a file, the server being in communication with a writer and a reader, the writer being a client of the server and having a first key that permits the writer to write to the file and the reader being another client of the server and having a combination key that comprises a combination of the first key and a second key wherein the stored encrypted filename is obtained by encrypting a filename of the file using the combination key and the combination key permits the reader to read the file and further wherein the server determines that the writer is authorized to write to the file by receiving from the writer the filename encrypted using the first key, applying a hash function to the received filename thereby forming a computed hash value and comparing the computed hash value to a stored hash value.

32. An apparatus for controlling access to a file comprising a server having a first stored encrypted filename of the file and a second stored encrypted filename of the file, the server being in communication with a writer and a reader, the writer being a client of the server and having a first key that permits the writer to write to the file and the server determining whether the writer is authorized to write to the file by receiving from the writer the filename encrypted using the second key and comparing the received filename to the second stored encrypted filename and the reader being another client of the server and having a second key that permits the reader to read the file.

33. The apparatus according to claim 32, wherein the reader decrypts the first stored encrypted filename using the first key.

34. The apparatus according to claim 32, wherein the server performs a hash function on the received filename before comparing the received filename to the second stored encrypted filename.

* * * * *

UNITED STATES PATENT AND TRADEMARK OFFICE
CERTIFICATE OF CORRECTION

PATENT NO. : 7,313,694 B2
APPLICATION NO. : 09/972385
DATED : December 25, 2007
INVENTOR(S) : Erik Riedel et al.

It is certified that error appears in the above-identified patent and that said Letters Patent is hereby corrected as shown below:

In column 9, line 25, in Claim 14, after "combination" insert -- of --.

In column 10, line 42, in Claim 30, insert -- a -- before "server".

Signed and Sealed this

Twenty-seventh Day of May, 2008

JON W. DUDAS
*Director of the United States Patent and Trademark Office*